(12) United States Patent
Desai

(10) Patent No.: US 11,777,834 B2
(45) Date of Patent: Oct. 3, 2023

(54) IP MULTIMEDIA SUBSYSTEM (IMS) COMMUNICATION TESTING

(71) Applicant: T-Mobile USA, Inc., Bellevue, WA (US)

(72) Inventor: Chirag Desai, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 673 days.

(21) Appl. No.: 15/340,857

(22) Filed: Nov. 1, 2016

(65) Prior Publication Data
US 2018/0123938 A1    May 3, 2018

(51) Int. Cl.
*H04L 43/50* (2022.01)
*H04L 41/0853* (2022.01)
*H04L 41/14* (2022.01)
*H04L 65/1016* (2022.01)
*H04L 43/08* (2022.01)

(52) U.S. Cl.
CPC .......... *H04L 43/50* (2013.01); *H04L 41/0853* (2013.01); *H04L 41/145* (2013.01); *H04L 65/1016* (2013.01); *H04L 43/08* (2013.01)

(58) Field of Classification Search
None
See application file for complete search history.

(56) References Cited

U.S. PATENT DOCUMENTS

| | | | | |
|---|---|---|---|---|
| 9,596,166 B2* | 3/2017 | Iyer | | H04L 43/50 |
| 2012/0173931 A1* | 7/2012 | Kube | | G01R 31/3181 |
| | | | | 714/37 |
| 2013/0185038 A1* | 7/2013 | Radu | | G06F 11/3419 |
| | | | | 703/2 |
| 2013/0287021 A1* | 10/2013 | Bulboaca | | H04L 43/12 |
| | | | | 370/389 |
| 2014/0082419 A1* | 3/2014 | Untinen | | G06F 11/0796 |
| | | | | 714/27 |
| 2014/0086075 A1* | 3/2014 | Asokan | | H04W 24/06 |
| | | | | 370/252 |
| 2014/0221049 A1* | 8/2014 | Kim | | H04M 1/56 |
| | | | | 455/566 |
| 2014/0248848 A1* | 9/2014 | Mufti | | H04W 76/10 |
| | | | | 455/404.1 |
| 2014/0289561 A1* | 9/2014 | Majumdar | | G06F 11/263 |
| | | | | 714/32 |
| 2015/0106670 A1* | 4/2015 | Gintis | | H04L 43/045 |
| | | | | 714/712 |
| 2015/0120947 A1* | 4/2015 | Guo | | H04L 65/1016 |
| | | | | 709/228 |
| 2015/0140956 A1* | 5/2015 | Prewitt, II | | H04M 3/362 |
| | | | | 455/405 |
| 2015/0154094 A1* | 6/2015 | Pasala | | G06F 11/26 |
| | | | | 714/37 |

(Continued)

*Primary Examiner* — Jeffrey M Rutkowski
*Assistant Examiner* — Ning Li
(74) *Attorney, Agent, or Firm* — Knobbe, Martens, Olson & Bear, LLP (57) ABSTRACT

Systems and methods for testing performance of communications over an IP Multimedia Subsystem (IMS) or Evolved Packet Core (EPC) are disclosed. Based on simulated communications that appear initiated from user devices, performance measures can be determined from monitored responses to the simulated communication as well as information obtained from nodes in the IMS or EPC.

25 Claims, 4 Drawing Sheets (56) References Cited

U.S. PATENT DOCUMENTS

| | | | |
|---|---|---|---|
| 2015/0186564 A1* | 7/2015 | Schmidt | H04L 41/22 |
| | | | 703/13 |
| 2015/0358477 A1* | 12/2015 | Jeong | H04W 40/24 |
| | | | 370/259 |
| 2016/0007392 A1* | 1/2016 | Bondrescu | H04W 40/00 |
| | | | 370/329 |
| 2016/0057284 A1* | 2/2016 | Nagpal | H04M 3/5232 |
| | | | 379/266.07 |
| 2017/0086120 A1* | 3/2017 | Huang | H04W 4/026 |
| 2017/0206125 A1* | 7/2017 | Takeshima | G06F 11/30 |
| 2017/0324617 A1* | 11/2017 | Prasad | H04W 24/06 |
| 2017/0364794 A1* | 12/2017 | Mahkonen | H04L 47/2441 |
| 2017/0373962 A1* | 12/2017 | Keeley | H04L 43/50 |
| 2018/0049054 A1* | 2/2018 | Doshi | H04W 24/10 |
| 2018/0115469 A1* | 4/2018 | Erickson | H04L 43/026 |
| 2018/0121335 A1* | 5/2018 | Cillis | G06F 11/3688 |
| 2018/0287767 A1* | 10/2018 | Paredes Cabrera | H04L 5/0087 |
| 2019/0104096 A1* | 4/2019 | Kell | H04L 51/22 |

* cited by examiner

IP MULTIMEDIA SUBSYSTEM (IMS) COMMUNICATION TESTING

BACKGROUND

Generally described, computing devices can be used to exchange data via a communication network. In one embodiment, mobile computing devices utilize a wireless communication network provided by a wireless service provider to facilitate the exchange of information in accordance with one or more wireless communication protocols. For example, a wireless service provider can maintain a wireless communication network in which a set of mobile devices are configured to exchange information in accordance with a second generation wireless communication protocol, such as the Global System for Mobile Communication wireless communication protocol (e.g., GSM). In another example, the wireless service provider can also maintain another wireless communication network in which mobile devices are configured to exchange information in accordance with a third generation or fourth generation wireless communication protocol such as the Wideband Code Division Multiple Access ("WCDMA") or Long Term Evolution ("LTE") wireless communication protocols.

Through advancements in wireless access technologies, Internet Protocol (IP) based communications for multimedia applications became available for various types of mobile devices. Examples of such applications include Voice over LTE Network (VoLTE), Video over LTE (ViLTE), Rich Communication Services (RCS), Voice over Wi-Fi (Vo-WiFi), Voice over IP (VoIP), white board discussions, video conferencing, Push to talk over Cellular (PoC), real-time content sharing including videos/audio files, instant messaging, interactive gaming, and the like. An architectural framework for delivering Internet Protocol (IP) multimedia to mobile users over various types of wireless and fixed networks to provide the same level of standardization is called the IP Multimedia Subsystem (IMS). Evolved Packet Core (EPC) is another framework for providing converged voice and data on a 4G Long-Term Evolution (LTE) network. Various nodes within the IMS or EPC communicate with one another in accordance with one or more protocols (e.g., Session Initiation Protocol (SIP)) for signaling and controlling multimedia communication sessions, including, for example, to establish, sustain, modify, and terminate media sessions for various applications.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

IMS (or EPC) service providers are generally interested in controlling and improving the quality of communications over IMS (or EPC) networks. IMS (or EPC) service providers may hire quality control employees and provide them with physical user devices (e.g., smart phones), so that the quality control employees may initiate communications (e.g., VoLTE sessions) over the IMS (or EPC) from the user devices at different locations. In order to test various aspects associated with the communications over the IMS (or EPC), different types of user devices may need to be configured physically in various ways (e.g., with different SIM cards) to serve as the basis for the tests. Quality control employees may also need to evaluate the IMS (or EPC) communications in person, for example, by actually talking and hearing during VoLTE sessions.

Generally described, aspects of the present disclosure are directed to the testing of communications or data exchanges over an IMS (or EPC). In some aspects, the present disclosure relates to the automatic configuration and simulation of communications initiated by one or more user devices. In other aspects, the present disclosure relates to the automatic testing and verification of various aspects of communications over the IMS (or EPC) in accordance with test cases.

In an illustrative embodiment, a testing service can be implemented on one or more computing devices that connect with IMS (or EPC) network(s). The testing service may receive configuration information relating to the quantity, type, identification, or other characteristics of user devices and/or associated infrastructure equipment (e.g., antennas located in different cell sites) that form a basis for a test. The testing service may process the configuration information and generate corresponding provisioning information that can be included in commands, instructions, or other messages to be communicated to applicable nodes in the IMS (or EPC), such that the IMS (or EPC) may view the commands, instructions, or other messages as if they are initiated from actual user devices bearing the specific characteristics. In other words, the testing service may automatically simulate communications initiated from one or more user devices of various configurations.

The testing service further obtains or generates commands, instructions, or other messages, which incorporate the provisioning information and are ready to be transmitted to one or more nodes in the IMS (or EPC). The commands, instructions, or other messages can be embodied as test cases or testing procedures, each specifically designed to test or verify certain aspects of performance (e.g., error rate, connection robustness, response time, audio or video quality, or the like) regarding certain type of communications (e.g., VoLTE, ViLTE, RCS, VoWiFi, PoC, or the like) over the IMS (or EPC) networks. The testing service may determine test cases for different simulated user devices and execute the test case by transmitting the associated commands, instructions, or other messages.

Once a test case is executed, the testing service may monitor and analyze responses that it receives from IMS (or EPC) nodes. In some embodiments, the testing service may further probe one or more IMS (or EPC) nodes that are on the communication path and inspect messages or data packets received by the IMS (or EPC) node that relate to the simulated user device and test case. In some embodiments, the testing service may decide whether to perform additional tests (e.g., selecting additional test cases to execute) based on results from prior test cases. In other embodiments, the testing service can assess IMS (or EPC) communication performance through response monitoring and IMS (or EPC) node probing during a series of test cases.

Although described with reference to IMS (or EPC) networks, elements of the present disclosure are not limited to the embodiment so illustrated. For example, the systems, methods, and functionalities disclosed herein may be used to analyze any network that facilitates communications among computing devices. As another example, although the term user device or user equipment (UE) is used in this document, the term represents any type of device having a component for communicating with one or more other devices via one or more communication paths. Such communication paths can include wireless communication paths (via infra-red, RF, optical, terrestrial, or satellite communication media) and wired communication paths. Still further, although the present disclosure is described with regard to specific methodologies and frameworks for the configuration and simulation of network communications, and the testing, assessment, or verification of performance aspects regarding the communications, the present disclosure should not be construed to require combination of the disclosed embodiments or any specific variation unless such combination or variation is expressly identified.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
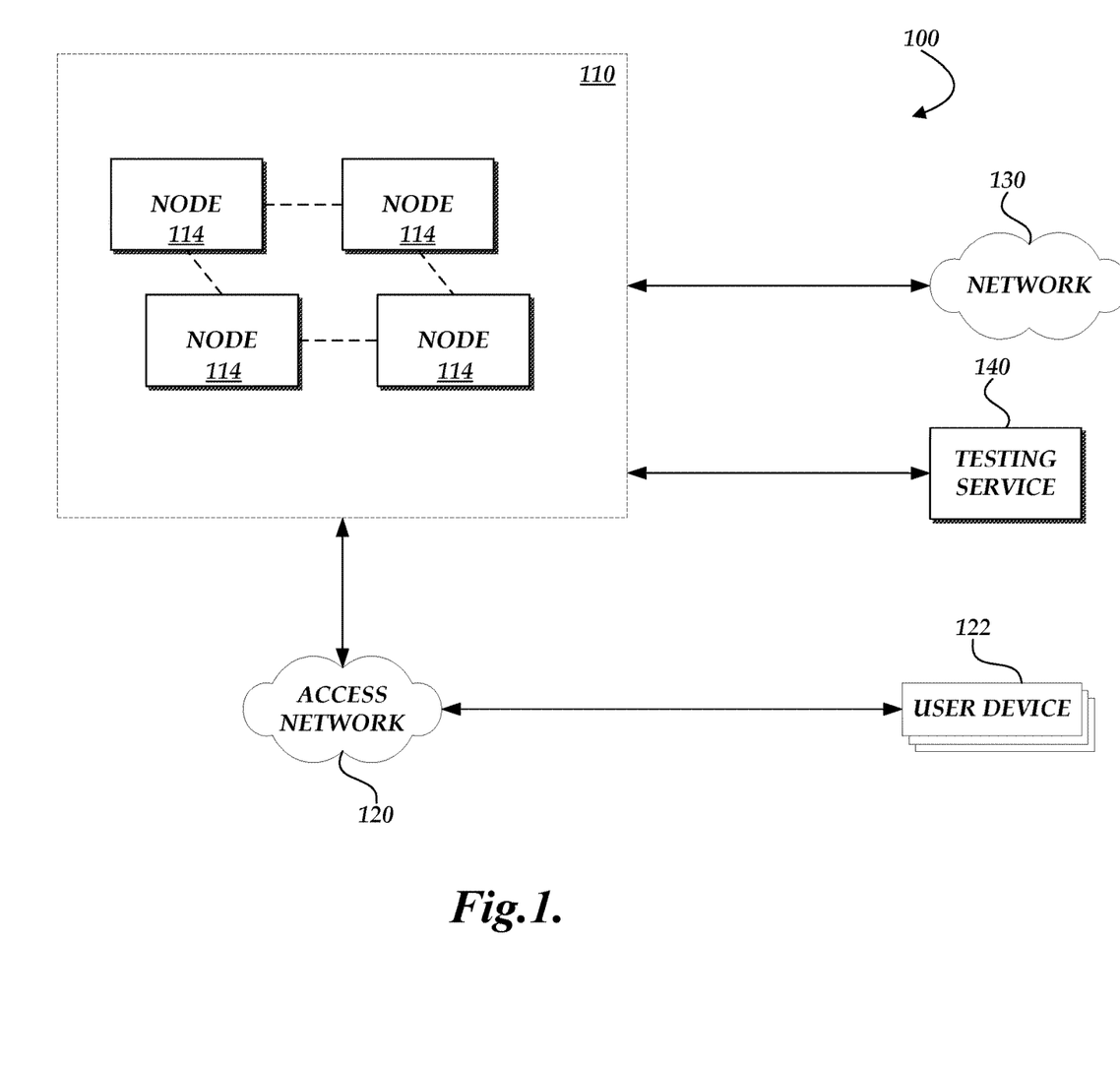
FIG. 1 is a block diagram of an exemplary IMS (or EPC) network environment.

FIG. 1 is a block diagram of an exemplary IMS (or EPC) network environment 100. The IMS (or EPC) network environment 100 can include a number of user devices 122, each associated with a user. The user devices 122 can correspond to a wide variety of devices or components that are capable of initiating, receiving or facilitating communications over a communication network including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., VoIP phones), cordless telephones, cellular telephones, smart phones, modems, personal digital assistants, laptop computers, gaming devices, media devices, and the like. In an illustrative embodiment, the user devices 122 include a wide variety of software and hardware components for establishing communications over one or more communication networks, including one or more access networks 120, one or more IMS (or EPC) networks 110, or other private or public networks such as network 130.

The user devices 122 can be communicatively connected via the access network 120, such as GSM EDGE Radio Access Network (GRAN), GSM EDGE Radio Access Network (GERAN), Universal Terrestrial Radio Access Network (UTRAN), Evolved Universal Terrestrial Radio Access (E-UTRAN), or the like. Illustratively, the access network 120 is distributed over land areas called cells, each served by at least one fixed-location transceiver, known as a cell site or base station. The base station provides the cell with the network coverage which can be used for transmission of voice, messages, or other data. A cell might use a different set of frequencies from neighboring cells, to avoid interference and provide guaranteed service quality within each cell. When joined together these cells provide radio coverage over a wide geographic area. This enables a large number of user devices 122 to communicate via the fixed-location transceivers. Although the access network 120 is illustrated as a single network, one skilled in the relevant art will appreciate that the access network can be include any number of public or private communication networks and/or network connections.

The IMS (or EPC) network environment 100 includes the IMS (or EPC) network 110 that provides various services to user devices 122 that are connected via the access network 120. One of the main functions of the IMS (or EPC) network 110 is to route telephone calls, messages, or other data/ content in accordance with one or more protocols. The IMS (or EPC) network 110 may provide high capacity communication facilities that connect various IMS (or EPC) nodes 114 implemented on one or more computing devices, allowing the nodes 114 to exchange information via various paths. Individual IMS (or EPC) nodes 114 in the IMS (or EPC) network 110 may correspond to one or more Proxy-CSCFs (P-CSCFs), Interrogating-CSCFs (I-CSCFs), Serving-CSCFs (S-CSCFs), Telephony Application Servers (TAS's), Presence Servers, Rich Messaging Servers (RMS's), home subscriber servers (HSS's), application service (AS) servers, or the like.

By way of an exemplary series of communications or data exchanges among nodes of the IMS (or EPC) network 110, a P-CSCF node located at the entry point of a network (visitor or home network) may initially receive a call connection request. Upon receipt of the request, the P-CSCF node, in turn, sends a call signaling to an I-CSCF node of the home network, which determines an S-CSCF node responsible for delivering the services to the user device(s). Generally stated, the I-CSCF node learns the identity of a proper S-CSCF node by communicating with an HSS node. The S-CSCF node executes comprehensive call control based on the services of the calling party and the called party. The S-CSCF node may extract the service information of the corresponding user(s) from the HSS node, which defines the trigger points (TP) of services and pointers to application servers where the specific application (service) logic resides. As discussed above, the call connection request may be simulated by a testing service 140 and not actually originated from a user device 122.

The IMS (or EPC) network 110 may be further connected to one or more networks 130, which may include any system for allowing multiple computing or telecommunication devices to communicate with each other. For example, the network 130 can be a Local Area Network (LAN), a Wide Area Network (WAN), a point-to-point network, a wireless network, a satellite network, a cable network, the Internet, combinations of the same, or the like. In some embodiments, user devices 122 or the test service 140 may communicate with the IMS (or EPC) network 110 via the one or more networks 130.

The IMS (or EPC) network environment 100 further includes the testing service 140, which is communicatively connected to the IMS (or EPC) network 110. The testing service 140 may be implemented as hardware and/or software on one or more computing devices. In some embodiments, at least some functionality of the testing service 140 is implemented by one or more virtual machines executing on host computing devices. The testing service 140 may be connected to the IMS (or EPC) network 110 directly or via another network (e.g., the access network 120, the network 130, or the like). In some embodiments, at least some functionality of the testing service 140 may be implemented on one or more nodes within the IMS (or EPC) network 110.

Figure 2:
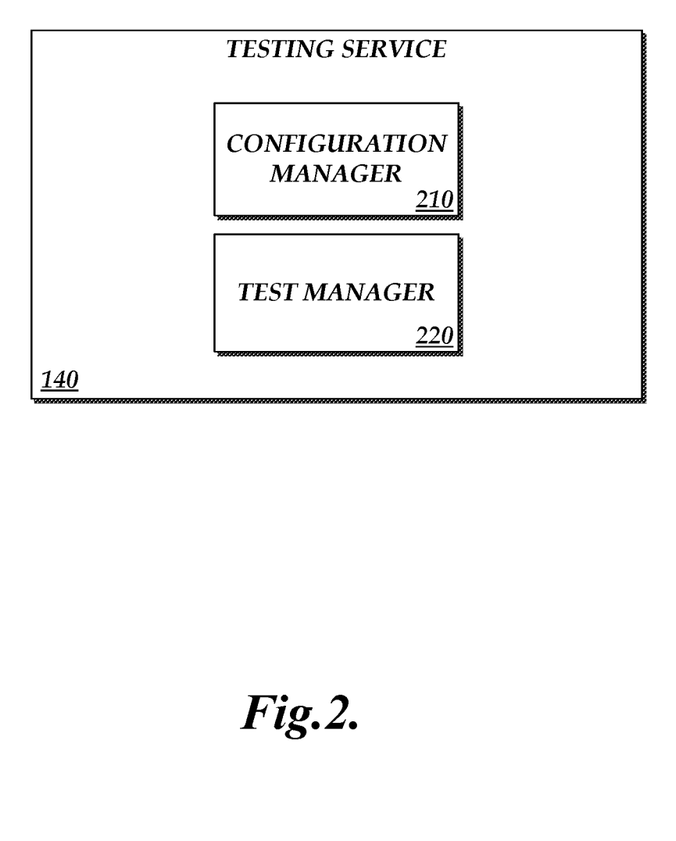
FIG. 2 is a block diagram of exemplary components of a testing service in the IMS (or EPC) network environment of FIG. 1.

FIG. 2 is a block diagram of exemplary components of the testing service 140 in the IMS (or EPC) network environment 100 of FIG. 1. Among other things, the testing service 140 may include a configuration manager 210 and a test manager 220 that can be configured to perform the routines, methods, or functionalities as disclosed herein.

For example, the configuration manager 210 can be configured to obtain configuration information for user devices to be simulated. Illustratively, the configuration manager 210 may read from a database or configuration file data entries regarding the quantity, type, processing power, networking capability, software or hardware configuration, identification (e.g., phone number, international mobile equipment identity (IMEI), international mobile subscriber identity (IMSI), integrated circuit card identifier (ICCID), issuer identification number (IIN), individual account identification number), or other characteristics of user devices and/or associated infrastructure equipment (e.g., antennas located in different cell sites). The configuration manager 210 can be further configured to generate provisioning information corresponding to the obtained configuration for different user devices, such that the provisioning information is properly formatted, specified, or otherwise made compatible to be included in commands, instructions, or other messages to be communicated to the IMS (or EPC) network 110.

As another example, the test manager 220 can be configured to obtain or generate commands, instructions, or other messages (which incorporate the provisioning information) to be transmitted to the IMS (or EPC) network 110. The commands, instructions, or other messages can be embodied as test cases or testing procedures, each specifically designed to test or verify a certain type of communication or certain aspect of performance regarding the IMS (or EPC). The test manager 220 may match test cases to simulated user devices and execute the selected test case(s) by transmitting the associated commands, instructions, or other messages. The test manager 220 may further monitor and analyze responses from IMS (or EPC) nodes, probe IMS (or EPC) nodes to inspect messages or data packets relating to the simulated user device and test case, and assess IMS (or EPC) communication performance based thereon.

Figure 3:
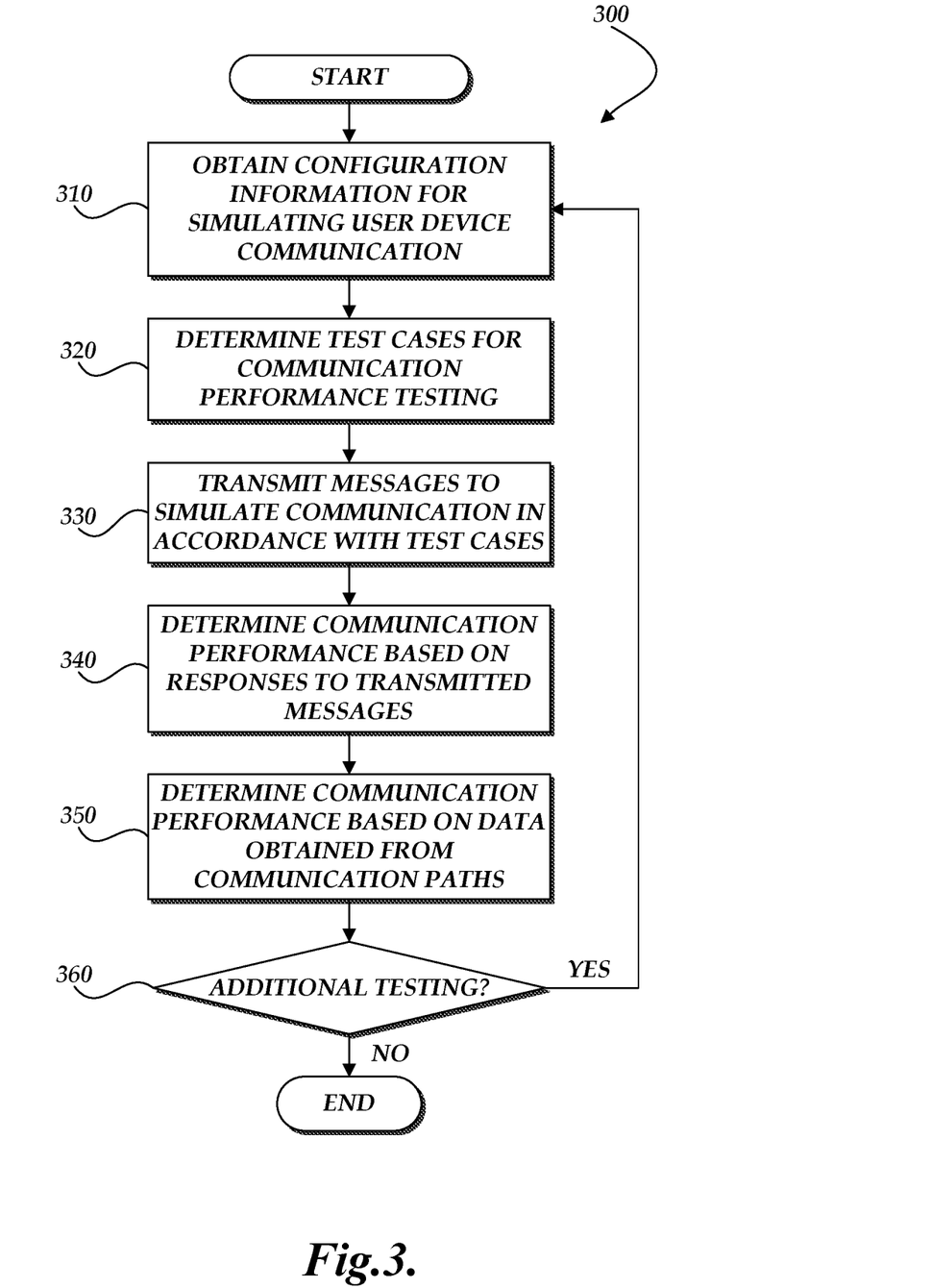
FIG. 3 is a flow diagram depicting a communication testing routine illustratively implemented by the testing service in the IMS (or EPC) network environment of FIG. 1.

FIG. 3 is a flow diagram depicting a communication testing routine 300 illustratively implemented by the testing service 140 in the IMS (or EPC) network environment 100 of FIG. 1. At block 310, the testing service 140 obtains configuration information for simulating communications over the IMS (or EPC) network 110 that appear originated from user devices 122. The configuration information may specify the quantity, type, identification, or other characteristics of user devices and/or associated infrastructure equipment that form a basis for a test. The configuration information may be obtained from a data file or database including data entries corresponding to configurations of each distinct user device-infrastructure equipment pair.

At block 320, the testing service 140 determines one or more test cases to test the performance of communications over the IMS (or EPC) network 110. The testing service 140 may obtain or generate commands, instructions, or other messages, that can be transmitted to one or more nodes in the IMS (or EPC) network 110 in accordance with one or more protocols. The commands, instructions, or other messages can be grouped into different test cases or testing procedures, each specifically designed to test or verify certain aspect(s) of performance (e.g., error rate, connection robustness, response time, audio or video quality, or the like) regarding certain type(s) of communications (e.g., VoLTE, ViLTE, RCS, VoWiFi, PoC, or the like) over the IMS (or EPC) network 110.

The testing service 140 may select or prioritize test cases based on real-time or historical IMS (or EPC) communication patterns. For example, the testing service 140 may select test cases to correspond to the proportion of different communication types that occurred during the past 24 hours. As another example, if there is a significant drop or fluctuation of one type of communication traffic (e.g., VoLTE traffic) over the IMS (or EPC) network 110 during the most recent hour, the testing service 140 may decide to select or prioritize test cases related to that type of communication.

The testing service 140 may also filter test cases based on the preferences of a service provider associated with the IMS (or EPC) network 110, aspects of performance that are important or perceivable to users, or compatibility with simulated user devices or infrastructure equipment. In some embodiments, the testing service 140 generates provisioning information based on the configuration information obtained at block 310 and incorporates the provisioning information with the selected test cases in accordance with applicable protocols.

At block 330, the testing service 140 transmits commands, instructions, or other messages to simulate communications in accordance with the selected test cases. The testing service 140 may simulate each user device-infrastructure equipment pair sequentially or in parallel. For each simulated user device-infrastructure equipment pair, the testing service 140 may execute one or more selected test cases by transmitting the associated commands, instructions, or other messages to one or more nodes in the IMS (or EPC) network 110.

At block 340, the testing service 140 may determine communication performance based on responses to the transmitted commands, instructions, or other messages. Illustratively, once a test case is executed, the testing service 140 may monitor and analyze responses that it receives from IMS (or EPC) nodes. In some embodiment, the testing service 140 may gauge the transaction time between the transmission of a message and the reception of a corresponding response, or count the number of message transmission retries or timeouts. Based on the transition time, number of retries or timeouts, or other characteristics associated with the transmission of messages and reception of responses, the testing service 140 may utilize one or more formulae to calculate a measure (e.g., latency, jitter, error rate, etc.) of communication performance. In some embodiments, the testing service 140 may parse the received responses to obtain various headers, parameters, settings, or other detailed information included in the responses, which the testing service 140 may utilize to further determine whether the received response corresponds to an expected response that satisfies certain performance requirements.

At block 350, the testing service 140 may also determine communication performance based on data obtained from IMS (or EPC) nodes on the path(s) of the simulated communications. In some embodiments, the testing service 140 may probe one or more IMS (or EPC) nodes that are on a path of any simulated communication traffic and inspect messages or data packets received by the IMS (or EPC) node. Illustratively, the testing service 140 may access some or all nodes in the IMS (or EPC) network 110 via an API or Web interface, and retrieve messages or data packets that are received at the IMS (or EPC) node. The testing service 140 may specifically retrieve messages or data packets that include information (e.g., IP addresses, domain or subdomain names, or the like) identifying any component (e.g., network interface controller (NIC)) associated with the testing service 140 as a transmission source. The testing service 140 may further compare the retrieved messages or data packets against the commands, instructions, or other messages transmitted by the testing service 140 to determine the data integrity, information loss, routing efficiency, or other aspects of performance related to the simulated communications.

In some embodiments, after determining the communication performance from block 340 and/or block 350, the testing service 140 makes an intelligent decision to determine if the test is successful, partially successful or unsuccessful. The determination can be made using a sophisticated blend of the results obtained in block 340 and/or block 350, evaluating the nature and criticality of the results, applying conditional logic, considering availability and stability of network components and deriving an all-inclusive (holistic view) assessment.

At block 360, the testing service 140 determines whether additional testing should be performed. In some embodiments, the testing service 140 may decide whether to perform additional tests (e.g., obtaining new or additional configuration information, selecting new or additional test cases to execute, or the like) based on results (e.g., one or more performance measures) from prior test cases. In some embodiments, additional tests are performed at predetermined time intervals. In other embodiments, additional tests can be triggered by network conditions as defined by a service provider associated with the IMS (or EPC) network 110. If the testing service 140 determines that additional testing is to be performed, the routine 300 proceeds to block 310, where new or additional configuration information is obtained. Otherwise, the routine 300 ends.

Figure 4:
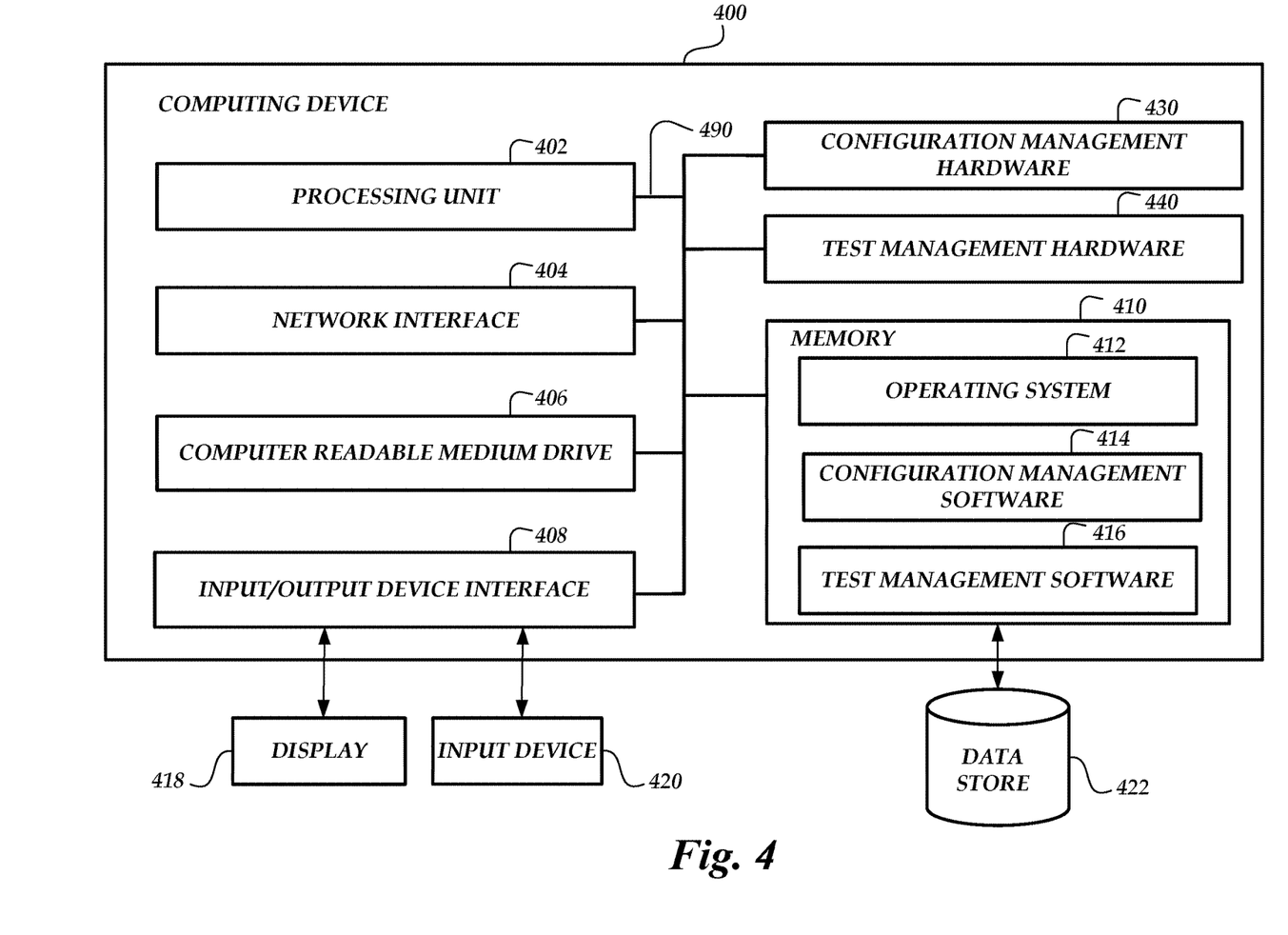
FIG. 4 is an illustrative functional block diagram of a computing device for implementing the testing service in the IMS (or EPC) network environment of FIG. 1.

FIG. 4 is an illustrative functional block diagram of a computing device 400 for implementing the testing service in the IMS (or EPC) network environment 100 of FIG. 1. The computing device 400 can be a server or other computing device, and can comprise a processing unit 402, a network interface 404, a computer readable medium drive 406, an input/output device interface 408, and a memory 410. The network interface 404 can provide connectivity to one or more networks (e.g., the network 102) or computing systems. The processing unit 404 can receive information and instructions from other computing systems or services via the network interface 404. The network interface 404 can also store data directly to memory 410. The processing unit 402 can communicate to and from memory 410 and output information to an optional display 418 via the input/output device interface 408. The input/output device interface 408 can also accept input from the optional input device 420, such as a keyboard, mouse, digital pen, microphone, mass storage device, etc.

The memory 410 contains computer program instructions that the processing unit 402 executes in order to implement one or more embodiments. The memory 410 generally includes RAM, ROM, and/or other persistent, non-transitory computer readable media. The memory 410 can store an operating system 412 that provides computer program instructions for use by the processing unit 402 or other elements included in the computing device in the general administration and operation of the computing device 400. The memory 410 can further include computer program instructions and other information for implementing aspects of the present disclosure. For example, in one embodiment, the memory 410 includes configuration management software 414 and test management software 416 that implements aspects of the present disclosure. The configuration management software 414 may illustratively correspond to all or some of the components of the configuration manager 210 depicted in FIG. 2, or to implement some portion of the illustrative routine 300 of FIG. 3. The test management software 416 may illustratively correspond to all or some of the components of the test manager 220 depicted in FIG. 2, or to implement some portion of the illustrative routine 300 of FIG. 3.

The computing device 400 may further comprise configuration management hardware 430 and test management hardware 440. The configuration management hardware 430 and the test management hardware 440 may illustratively implement aspects of the present disclosure, such as components of the configuration manager 210 and test manager 220 depicted in FIG. 2, or relevant portions of the illustrative routine 300 of FIG. 3, respectively. In some embodiments, the configuration management hardware 430 and test management hardware 440 may be implemented in part with the processing unit 402, the computer readable medium drive 406, or other elements of the computing device 400.

The elements included in the computing device 400 may be coupled by a bus 490. The bus 490 may be a data bus, communication bus, or other bus mechanism to enable the various components of the computing device 400 to exchange information. In some embodiments, the computing device 400 may include additional or fewer components than are shown in FIG. 4. For example, a computing device 400 may include more than one processing unit 402 and computer readable medium drive 406. In another example, the computing device 402 may not be coupled to a display 418 or an input device 420. In still another example, the configuration management software 414, test management software 416, the configuration management hardware 430, or the test management hardware 440 may include various interdependent or independent subcomponents implementing different aspects of the present disclosure. In some embodiments, two or more computing devices 400 may together form a computer system for executing features of the present disclosure.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware (e.g., application-specific logic circuitry), computer software executed by hardware, or combinations of both. To clearly illustrate this interchangeability of hardware and software, various illustrative components, blocks, modules, and steps have been described above generally in terms of their functionality. Whether such functionality is implemented as hardware, or as software executed by hardware, depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a computing device, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for testing performance of communications over an IP Multimedia Subsystem (IMS) or Evolved Packet Core (EPC) network, the method comprising:
   obtaining configuration information for simulating user device-initiated communications over the IMS or EPC network;
   prioritizing a plurality of test cases based on communication patterns in the IMS or EPC network, wherein the communication patterns comprise feedback identifying a proportion of different communication types occurring during a previous designated time window and wherein the prioritization corresponds to the proportion of different communication types during the previous designated time window;
   selecting a test case from the prioritized plurality of test cases;
   executing the test case based, at least in part, on the configuration information, wherein the test case includes one or more messages in accordance with a protocol for communicating over the IMS or EPC network, and wherein executing the test case comprises initiating transmission of the one or more messages from a simulated user device to illicit and monitor a response from an IMS or EPC node;
   obtaining at least one response to the one or more messages; and
   determining a measure of performance based, at least in part, on the response.

2. The computer-implemented method of claim 1, wherein the configuration information indicates at least one of a quantity, type, or identification of user devices for simulation.

3. The computer-implemented method of claim 2, wherein the configuration information further indicates one or more infrastructure equipment associated with the user devices for simulation.

4. The computer-implemented method of claim 1, wherein the IMS or EPC node corresponds to at least one of a Proxy-CSCF (P-CSCF), Interrogating-CSCF (I-CSCF), Serving-CSCF (S-CSCF), Telephony Application Server (TAS), Presence Server, Rich Messaging Server (RMS), Home Subscriber Server (HSS), or Application Service (AS) Server.

5. The computer-implemented method of claim 1, wherein the type of communication corresponds to at least one of Voice over LTE Network (VoLTE), Video over LTE (ViLTE), Rich Communication Services (RCS), Voice over Wi-Fi (VoWiFi), or Push to talk over Cellular (PoC) communication.

6. The computer-implemented method of claim 1, further comprising determining whether to execute an additional test case based on a result from the test case.

7. The computer-implemented method of claim 1, wherein the one or more messages comprises a call connection request.

8. The computer-implemented method of claim 1, further comprising generating provisioning information corresponding to the configuration information and including the provisioning information in the one or more messages.

9. The computer-implemented method of claim 1, further comprising filtering the test case from the prioritized plurality of test cases based on compatibility with simulated user devices or infrastructure equipment.

10. The computer-implemented method of claim 1, further comprising filtering the test case from the prioritized plurality of test cases based on preferences of a service provider associate with the IMS or EPC network.

11. A non-transitory computer-readable medium storing computer-executable instructions that, when executed by a processor, causes the processor to perform operations comprising:
obtaining configuration information for simulating communications initiated from at least one user device and directed to one or more nodes of an IP Multimedia Subsystem (IMS) or Evolved Packet Core (EPC) network, wherein the IMS or EPC network includes a plurality of nodes;
prioritizing one or more messages from a plurality of messages, wherein the one or more messages match the configuration information for the at least one user device for transmission to the one or more nodes of the IMS or EPC network, wherein the plurality of messages are based on real-time or historical communication patterns in the IMS or EPC network, wherein the real-time or historical communication patterns for a communication parameter comprises a pattern identifying a proportion of different communication types occurring during a previous designated time window, and wherein the prioritization corresponds to the proportion of different communication types during the previous designated time window;
transmitting the one or more messages to the one or more nodes to cause a simulated communication in order to illicit and monitor a response from the one or more nodes; and
determining a measure of performance based, at least in part, on the response to the one or more messages.

12. The non-transitory computer-readable medium of claim 11, wherein the operations further comprise probing at least one node of the IMS or EPC network.

13. The non-transitory computer-readable medium of claim 12, wherein the at least one node is on a network path of the simulated communication.

14. The non-transitory computer-readable medium of claim 12, wherein probing the at least one node comprises obtaining at least one message or data packet received at the at least one node.

15. The non-transitory computer-readable medium of claim 14, wherein the at least one message or data packet relates to the at least one user device.

16. The non-transitory computer-readable medium of claim 11, wherein transmitting the one or more messages comprises transmitting the one or more messages in accordance with a protocol for communication over the IMS or EPC network.

17. The non-transitory computer-readable medium of claim 16, wherein the protocol for communication over the IMS or EPC network corresponds to Session Initiation Protocol (SIP).

18. A system comprising:
a plurality of computing devices in communication with one another via an IP Multimedia Subsystem (IMS) or Evolved Packet Core (EPC) network; and
a target computing device communicatively connected to the IMS or EPC network, the target computing device configured to:
determine a first test case for testing performance of communications initiated from at least one simulated user device over the IMS or EPC network, wherein the first test case is selected from a plurality of test cases prioritized based on real-time performance feedback for a communication parameter in the IMS or EPC network, wherein the real-time performance feedback for a communication parameter comprises feedback identifying a threshold fluctuation for one type of communication during a previous designated time window and wherein the prioritization corresponds to the one type of communication meeting the threshold fluctuation during the previous designated time window;
execute the first test case including one or more messages to be communicated to the IMS or EPC network, wherein executing the test case comprises automatically simulating the one or more messages as initiated from the at least one simulated user device in order to illicit and monitor a response from an IMS or EPC node; and
determine a measure of performance based, at least in part, on the response to the one or more messages.

19. The system of claim 18, wherein the measure of performance corresponds to at least one of an error rate, connection robustness, response time, audio quality, or video quality.

20. The system of claim 18, wherein the target computing device is further configured to obtain configuration information for simulating the at least one user device.

21. The system of claim 20, wherein the target computing device is further configured to generate the one or more messages based, at least in part, on the configuration information.

22. The system of claim 18, wherein the target computing device is further configured to parse the response to derive one or more parameters included in the response.

23. The system of claim 22, wherein the measure of performance is further based on the one or more parameters.

24. The system of claim 18, wherein the target computing device is further configured to determine a second test case based, at least in part, on the determined measure of performance.

25. The computer-implemented method of claim 18, wherein the threshold fluctuation corresponds to a drop of one type of communication traffic.

* * * * *